United States Patent [19]
Suzuki et al.

[11] Patent Number: 5,240,999

[45] Date of Patent: Aug. 31, 1993

[54] POLYARYLATE/POLYESTER THERMOPLASTIC RESIN COMPOSITION HAVING HIGH IMPACT RESISTANCE AND LOW MELT VISCOSITY

[75] Inventors: Noriyuki Suzuki; Haruo Tomita; Masahiro Asada, all of Hyogo, Japan

[73] Assignee: Kanegafuchi Kagaku Kogyo Kabushiki Kaisha, Osaka, Japan

[21] Appl. No.: 892,324

[22] Filed: Jun. 2, 1992

[30] Foreign Application Priority Data

Jun. 3, 1991 [JP] Japan .................. 3-159588

[51] Int. Cl.$^5$ .................. C08L 67/02; C08L 67/03
[52] U.S. Cl. .................. 525/68; 525/64; 525/132; 525/133; 525/175
[58] Field of Search .................. 525/68, 133, 132, 64

[56] References Cited

U.S. PATENT DOCUMENTS 4,231,922 11/1980 Robeson .................. 525/64
4,902,747 2/1990 Kassal .................. 525/151

*Primary Examiner*—Patricia A. Short
*Attorney, Agent, or Firm*—Armstrong, Westerman, Hattori, McLeland & Naughton

[57] ABSTRACT

A resin composition which includes (A) 100 parts of a blend of a polyacrylate and a poly(alkylene-phenylene ester) and (B) 1–50 parts of a chemically modified polyolefin copolymer exhibits superior impact resistance, particularly low temperature impact resistance, while retaining good melt viscosity for molding. The polyacrylate may be produced by polymerizing a dihydric phenol formula I:

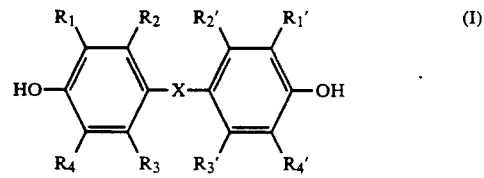

with an aromatic dicarboxylic acid, a dichloride derivative, an alkylated derivative or an arylated derivative thereof. The chemically modified polyolefin copolymer has a structural unit containing at least one amide group at and at least one glycidyloxy or glycidyl group, with the number of the structural unit contained in the copolymer being one per from 4 to 5,000 carbon atoms of the polyolefin moiety.

10 Claims, No Drawings

POLYARYLATE/POLYESTER THERMOPLASTIC RESIN COMPOSITION HAVING HIGH IMPACT RESISTANCE AND LOW MELT VISCOSITY

FIELD OF THE INVENTION

The present invention relates to a novel thermoplastic resin composition which shows excellent flowability during molding and gives molded articles having excellent impact resistance and a high heat distortion temperature.

BACKGROUND OF THE INVENTION

Resin compositions comprising a polyarylate and a poly(alkylene-phenylene ester) are known, which can give molded articles having an excellent balance between heat distortion resistance and chemical resistance. However, these compositions have a drawback that their impact resistance is generally low and this poses practical problems.

As an expedient for improving the poor impact resistance, incorporation of a glycidyl ester group-containing copolymer produced from an α-olefin and a glycidyl ester of an α,β-unsaturated acid into a composition of the above kind is disclosed in JP-A-61-26657. (The term "JP-A", as used herein means an "unexamined published Japanese patent application".) This expedient, however, is defective in that almost no improvement is attained in notched Izod impact strength at a low temperature (−30° C.), although the room-temperature notched Izod impact strength of the composition is surely improved. In addition, the thus-modified composition has a practically serious problem that it shows significantly impaired flowability during molding.

SUMMARY OF THE INVENTION

The present inventors have conducted intensive studies in order to overcome the above-described problems. As a result, it has been found that a novel resin composition comprising a polyarylate, a poly(alkylene-phenylene ester), and a specific chemically modified polyolefin copolymer has greatly improved impact resistance, in particular, lowtemperature Izod impact strength, while retaining good flowability for molding. The present invention has been completed based on this finding.

An object of the present invention is to provide a resin composition having exceedingly good impact resistance, particularly, low-temperature Izod impact strength, as well as good flowability for molding.

Other objects and effects of the present invention will be apparent from the following description.

According to the present invention, a thermoplastic resin composition is provided which comprises 100 parts by weight of the following component (A) and from 1 to 50 parts by weight of the following component (B):

(A) a resin component comprising (i) from 10 to 90% by weight of a polyarylate produced by polymerizing a dihydric phenol represented by formula (I)

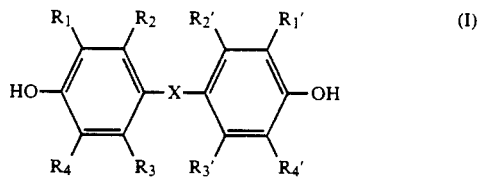

wherein X is one member selected from the group consisting of O, S, SO$_2$, CO, a C$_1$–C$_{20}$ alkylene group, and a C$_6$–C$_{20}$ alkylidene group and R$_1$, R$_2$, R$_3$, R$_4$, R$_1'$, R$_2'$, R$_3'$, and R$_4'$, each is one member selected from the group consisting of hydrogen atom, a halogen atom, and a C$_1$–C$_4$ hydrocarbon group, or a derivative of the dihydric phenol, with an aromatic dicarboxylic acid or a derivative thereof and (ii) from 90 to 10% by weight of a poly(alkylenephenylene ester);

(B) a chemically modified polyolefin copolymer having a structural unit containing at least one amide group and at least one glycidyloxy or glycidyl group, the number of the structural unit contained in the copolymer being one per from 4 to 5,000 carbon atoms of the polyolefin moiety.

DETAILED DESCRIPTION OF THE PREFERRED EMBODIMENTS

Resin component (A) contained in the resin composition of the present invention comprises (i) a polyarylate and (ii) a poly(alkylene-phenylene ester).

This polyarylate (i) may be synthesized from a dihydric phenol or derivative thereof and an aromatic dicarboxylic acid or derivative thereof through a polycondensation reaction, for example, an interfacial polycondensation, a solution polymerization, a molten-state polymerization.

As the dihydric phenol, any of various dihydric phenols represented by formula (I)

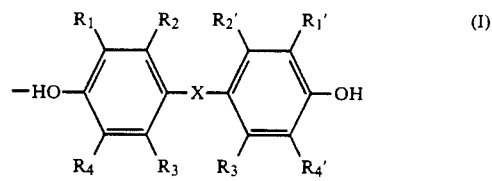

wherein X is one member selected from the group consisting of O, S, SO$_2$, CO, a C$_1$–C$_{20}$ alkylene group, and a C$_6$–C$_{20}$ alkylene group and R$_1$, R$_2$, R$_3$, R$_4$, R$_1'$, R$_2'$, R$_3'$, and R$_4'$ each is one member selected from the group consisting of hydrogen atom, a halogen atom, and a C$_1$–C$_4$ hydrocarbon group.

As shown in formula (I), the dihydric phenol may be substituted, preferably with a halogen atoms, such as chlorine, bromine atoms, and a C$_1$–C$_4$ alkyl group.

Examples of the dihydric phenol include 2,2-bis(4'-hydroxyphenyl)propane (also called bisphenol A), bis(4-hydroxyphenyl)methane, bis(4-hydroxy-3,5-dimethylphenyl)methane, bis(4-hydroxy-3,5-dichlorophenol)methane, 1,1-bis(4'-hydroxyphenyl)ethane, bis(4-hydroxyphenyl)cyclohexylmethane, 1,1-bis(4'-hydroxyphenyl)-1-phenylethane, 4,4,-dihydroxydiphenyl ether, bis(4-hydroxy-3,5-dimethylphenyl)ether, bis(4-hydroxyphenyl) sulfone, bis(4-hydroxy-3,5-dimethylphenyl)sulfone, 4,4'-dimethylphenyl)propane.

Derivatives of such dihydric phenols include alkali metal salts and diacetates thereof. These dihydric phenols and derivatives thereof may be used alone or in combination of two or more thereof. If required and necessary, a dihydroxy compound such as, for example, 4,4'-dihydroxybiphenyl, hydroquinone, resorcinol, or 2,6-dihydroxynaphthalene may be used in a small amount along with the dihydric phenol or its derivative described above.

As the aromatic dicarboxylic acid for use in producing the polyarylate to be contained in the composition of the present invention, any of various kinds of aromatic dicarboxylic acids which may be substituted by a halogen atom, such as chlorine, bromine atom, or a $C_1$–$C_4$ alkyl group, can be used. Examples thereof include isophthalic acid, terephthalic acid, (diphenyl ether)-4,4'-dicarboxylic acid, benzophenone-4,4'-dicarboxylic acid, and naphthalene-2,6-dicarboxylic acid.

Particularly preferred of these aromatic dicarboxylic acids are isophthalic acid and terephthalic acid. Derivatives of those aromatic dicarboxylic acids include dichlorides thereof and products of alkylation or arylation thereof. Such aromatic dicarboxylic acids and derivatives thereof may be used alone or in combination of two or more thereof.

From the dihydric phenol or its derivative and the aromatic dicarboxylic acid or its derivative, a polyarylate to be employed in the present invention can be produced by any of various polymerization methods such as, for example, interfacial polycondensation, solution polymerization, and molten-state polymerization. It is, however, preferable that the polyarylate thus produced have a solution viscosity in the range of from 0.2 to 1.5 (chloroform solution, 30° C.) in terms of intrinsic viscosity Use of polyarylates having viscosities outside this range tends to give resin compositions having impaired impact resistance, heat distortion resistance, moldability, or other properties.

The poly(alkylene-phenylene ester) (ii) to be employed in the resin composition of the present invention may be produced by any of such polymerization methods as interfacial polymerization, solution polymerization, moltenstate polymerization, and the like. This poly(alkylenephenylene ester) is represented by formula (IV)

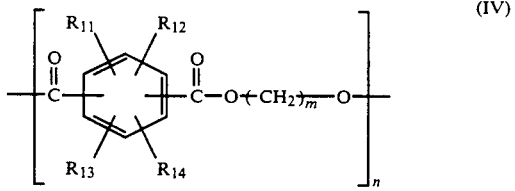

wherein $R_{11}$, $R_{12}$, $R_{13}$, and $R_{14}$ each is one member selected from the group consisting of hydrogen atom, an alkyl group, an alkoxy group, an alkyl ester group, cyano group, amino group, sulfonic acid group, nitro group, and phenoxy group and m is an integer of from 1 to 10.

Specific examples of the poly(alkylene-phenylene ester) to be contained in the composition of the present invention include such polyesters as poly(ethylene terephthalate), poly(ethylene isophthalate), poly(trimethylene terephthalate), poly(trimethylene isophthalate), poly(butylene terephthalate), and poly(butylene isophthalate). These polyesters may be used alone or in combinations of two or more thereof. Preferred of these are poly(ethylene terephthalate) (PET) and poly(butylene terephthalate) (PBT).

It is preferred that the poly(alkylene-phenylene ester) have an intrinsic viscosity in the range of from 0.3 to 1.5 dl/g, especially from 0.4 to 1.2 dl/g (phenol/tetrachloroethane =6/4 (by weight), 25° C.). Intrinsic viscosities outside the above range are not preferred in that use of polyesters having intrinsic viscosities below 0.3 dl/g results in resin compositions having insufficient impact strengths, while polyesters having intrinsic viscosities exceeding 1.5 dl/g tend to give resin compositions showing poor flowability during molding.

The chemically modified polyolefin copolymer (B) contained in the resin composition of the present invention has a structural unit containing at least one amide group and at least one glycidyloxy or glycidyl group, with the number of this structural unit contained in the chemically modified copolymer being one per from 4 to 5,000 carbon atoms of the polyolefin moiety. A particularly preferred example of this chemically modified polyolefin copolymer is one having a glycidyl ether group-containing structural unit represented by formula (II)

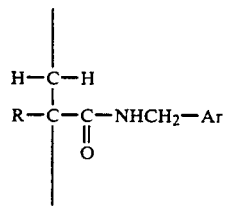

wherein Ar represents an aromatic hydrocarbon group having from 6 to 23 carbon atoms and containing at least one glycidyloxy group and R represents hydrogen atom or methyl group), the number of the structural unit of formula (II) contained in the chemically modified copolymer being one per from 4 to 5,000 carbon atoms of the polyolefin moiety.

Examples of the polyolefin in the modified polyolefin copolymer to be incorporated in the resin composition of the present invention include olefin homopolymers such as polyethylene, polypropylene, and poly(butene-1) and olefin copolymers such as ethylene-propylene copolymers, ethylenepropylene-diene copolymers, ethylene-vinyl acetate copolymers, and ethylene-acrylic ester copolymers. These polyolefins may be used alone or in combination of two or more thereof. Particularly preferred of these are ethylenepropylene copolymers and ethylene-propylene-diene copolymers.

Examples of the diene include conjugated dienes such as butadiene, isoprene, chloroprene, and phenylpropadiene, cyclic dienes such as cyclopentadiene, 1,5-norbornadiene, 1,3-cyclohexadiene, 1,4-cyclohexadiene, 1,5-cyclooctadiene, and 1,3-cyclooctadiene, and $\alpha$,$\omega$-nonconjugated dienes. These may be used alone or in combination of two or more thereof.

In producing those olefin copolymers, one or more unsaturated monomers copolymerizable with the comonomers may be copolymerized therewith. Examples of the unsaturated monomers include vinyl ethers, vinyl esters such as vinyl acetate and vinyl propionate, acrylic or methacrylic esters such as methyl, ethyl, propyl, and butyl acrylates or methacrylates, acrylonitrile, and styrene.

The glycidyl ether group-containing structural unit represented by formula (II) given above may be incorporated by the radical addition or copolymerization of a glycidyl ether group-containing modifier represented by formula (V)

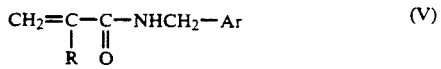

where Ar represents an aromatic hydrocarbon group having from 6 to 23 carbon atoms and contains at least one glycidyloxy group and R represents hydrogen atom or methyl group to or with the polyolefin described above. Such modifiers can be produced by the method described in JP-B-2-051550. (The term "JP-B" as used herein means an "examined Japanese patent publication".)

One particularly preferred example of the modifier represented by formula (V) is a compound shown by formula (VI).

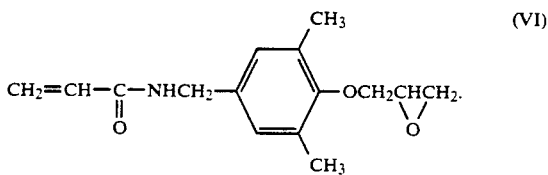

The chemically modified polyolefin copolymer (B) to be incorporated in the resin composition of the present invention should have a structural unit containing at least one amide group and at least one glycidyloxy or glycidyl group, with the number of this structural unit contained in the modified copolymer being one per from 4 to 5,000 carbon atoms, preferably from 50 to 3,000 carbon atoms, of the polyolefin described above. It is preferable that the above structural unit be a glycidyl ether group-containing structural unit represented by formula (II) given hereinabove. Use of a modified polyolefin copolymer which does not satisfy the above requirement is disadvantageous in that a sufficient improvement in impact resistance cannot be attained or the resulting resin composition shows impaired flowabilty during molding.

Preferred examples of modified polyolefin copolymer (B) include ethylene-propylene or ethylene-propylene-diene copolymers onto which a glycidyl ether group-containing structural unit shown by formula (III)

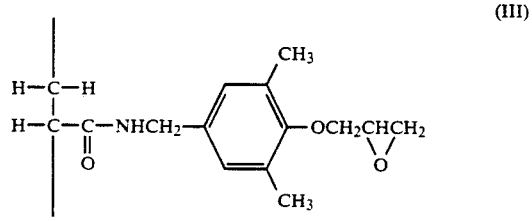

has been grafted.

It is preferable that modified polyolefin copolymer (B) usually have a melt index (MI) in the range of from 0.01 to 100 g/10 min. Melt indexes outside this range are not preferred because the impact resistance-improving effect of such copolymers tends to be insufficient. The melt index values herein mean those measured in accordance with ASTM D-1238 at 230° C.

Production methods for chemically modified polyolefin copolymer (B) are not particularly limited. For example, chemically modified polyolefin copolymer (B) may be obtained by melt-mixing a polyolefin with the above-described modifier using any of various blenders such as an extruder, heated rollers, Brabender, Banbury mixer, and the like. Alternatively, chemically modified polyolefin copolymer (B) may be synthesized by copolymerizing one or more olefin monomers with the above-described modifier by means of a generally employed polymerization method such as, for example, radical polymerization, cationic polymerization, anionic polymerization, or coordination polymerization.

The amount of the above-described chemically modified polyolefin copolymer (B) incorporated in the resin composition of the present invention is from 1 to 50 parts by weight, preferably from 3 to 30 parts by weight, per 100 parts by weight of resin blend (A) consisting of from 10 to 90% by weight of polyarylate (i) and from 90 to 10% by weight of poly(alkylene-phenylene ester) (ii). If the incorporated amount of chemically modified polyolefin copolymer (B) is below 1 part by weight, a sufficient improvement in impact resistance cannot be attained. If the amount thereof exceeds 50 parts by weight, the resin composition may have poor heat distortion resistance and show poor flowability during molding.

In producing the thermoplastic resin composition of the present invention, methods for blending components (A) and (B) are not particularly limited. However, a melt mixing method is most preferably used, in which components (A) and (B) may be melt-mixed by means of any of various blenders such as, for example, an extruder, heated rollers, Brabender, Banbury mixer, and the like.

Various additives may be optionally incorporated into the resin composition of the present invention to impart thereto one or more functions not originally possessed by the composition. Examples of the additives include lubricants such as waxes, stabilizers of the phosphorus-containing or phenolic type or other types, ultraviolet absorbers, pigments, flame retardants, plasticizers, inorganic fillers, and reinforcing fibers.

The thermoplastic resin composition of the present invention shows excellent flowability during molding and molded articles obtained from the composition have excellent impact resistance and a high heat distortion temperature. The resin composition of the present invention, therefore, is suitable as a molding material for producing, for example, automotive parts, machine parts, electrical or electronic parts, and other molded articles.

The present invention will be illustrated in more detail with reference to the following examples, but the invention is not construed as being limited thereto.

1. Production of Resin Compositions

EXAMPLES 1 to 14

The polyarylate, poly(alkylene-phenylene ester)s, and modified polyolefin copolymers each specified below were blended according to the formulations given in Table 1. Each component was extruded at 270° C with a twin-screw extruder (LABOTEX 30, manufactured by The Japan Steel Works, Ltd.) to produce a resin composition in pellet form.

Polyarylate:

Bisphenol A and a mixture of isophthaloyl dichloride and terephthaloyl dichloride (8/2 by mol) were subjected to polycondensation reaction in a molar ratio of 1:1, thereby preparing a polyarylate (intrinsic viscosity, 0.63).

Poly(Alkylene-Phenylene Ester)s:

Poly(ethylene terephthalate) (Kurapet KD226R, manufactured by Kuraray Co., Ltd., Japan) and poly(butylene terephthalate) (Valox 310, manufactured by General Electric Co.) were used.

Chemically Modified Polyolefin Copolymer (B-1):

To 100 parts by weight of an ethylene-propylenediene copolymer (EP 57P, manufactured by Japan Synthetic Rubber Co., Ltd.) having a melt index of 0.4 g/10 min as measured at 230° C. under a load of 2.2 kg were added, at ambient temperature, 3 parts by weight of a glycidyl ether groupcontaining modifier shown by formula (VI)

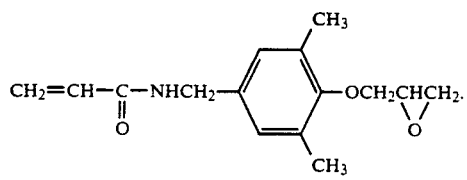

and 0.16 part by weight of α,α'-bis(t-butylperoxy-m-isopropyl)benzene (Perbutyl P, manufactured by Nippon Oil & Fats Co., Ltd., Japan). This mixture was extruded at 250° C. with a twin-screw extruder (TEX 44, manufactured by The Japan Steel Works, Ltd.), thereby allowing the modifier to react with the copolymer. Thus, a chemically modified polyolefin copolymer (B-1) in pellet form was obtained.

The grafted amount of the modifier was determined by crushing pellets of the chemically modified copolymer, washing the resulting powder five times with methylene chloride to remove the unreacted modifier and homopolymers of the modifier, and then subjecting the washed powder to IR spectroscopy and elemental analysis for nitrogen atom. As a result, the grafted modifier amount was found to be 1.9% by weight based on 100% by weight of a modified polyolefin copolymer.

Chemically modified polyolefin copolymer B-1 obtained above in pellet form had a melt index as measured at 230° C. of 0.5 g/10 min, and was also found to have one structural unit containing a glycidyl ether group as shown by formula (II), per 972 carbon atoms of the polyolefin moiety.

Chemically Modified Polyolefin Copolymer (B-2):

To 100 parts by weight of an ethylene-propylenediene copolymer (EP 57P, manufactured by Japan Synthetic Rubber Co., Ltd.) having a melt index of 0.4 g/10 min as measured at 230° C. under a load of 2.2 kg were added, at ambient temperature, 6 parts by weight of a glycidyl ether group-containing modifier shown by formula (VI) given above and 0.16 part by weight of α,α'-bis(t-butylperoxy-m-isopropyl)benzene (Perbutyl P, manufactured by Nippon Oil & Fats Co., Ltd.). This mixture was extruded at 250° C. with a twin-screw extruder (TEX 44, manufactured by The Japan Steel Works, Ltd.), thereby allowing the modifier to react with the copolymer. Thus, a chemically modified polyolefin copolymer (B-2) in pellet form was obtained.

The grafted amount of the modifier was determined by crushing pellets of the chemically modified copolymer, washing the resulting powder five times with methylene chloride to remove the unreacted modifier and homopolymers of the modifier, and then subjecting the washed powder to IR spectroscopy and elemental analysis for nitrogen atom. As a result, the grafted modifier amount was found to be 3.8% by weight.

Chemically modified polyolefin copolymer B-2 obtained above in pellet form had a melt index as measured at 230° C. of 0.4 g/10 min, and was also found to have one structural unit containing a glycidyl ether group and shown by formula (II), per 486 carbon atoms of the polyolefin moiety.

Chemically Modified Polyolefin Copolymer (B-3):

To 100 parts by weight of an ethylene-propylene copolymer (EP 02P, manufactured by Japan Synthetic Rubber Co., Ltd.) having a melt index of 3.2 g/10 min as measured at 230° C. under a load of 2.2 kg were added, at ambient temperature, 3 parts by weight of a glycidyl ether group-containing modifier shown by formula (VI) given above and 0.16 part by weight of α,α'-bis(t-butylperoxy-m-isopropyl)benzene (Perbutyl P, manufactured by Nippon Oil & Fats Co., Ltd.). This mixture was extruded at 250° C. with a twin-screw extruder (TEX 44, manufactured by The Japan Steel Works, Ltd.), thereby allowing the modifier to react with the copolymer. Thus, a chemically modified polyolefin copolymer (B-3) in pellet form was obtained.

The grafted amount of the modifier was determined by crushing pellets of the chemically modified copolymer, washing the resulting powder five times with methylene chloride to remove the unreacted modifier and homopolymers of the modifier, and then subjecting the washed powder to IR spectroscopy and elemental analysis for nitrogen atom. As a result, the grafted modifier amount was found to be 2.4% by weight.

Chemically modified polyolefin copolymer B-3 obtained above in pellet form had a melt index as measured at 230° C. of 4.3 g/10 min, and was also found to have one structural unit containing a glycidyl ether group and shown by formula (II), per 758 carbon atoms of the polyolefin moiety.

Chemically Modified Polyolefin Copolymer (B-4):

To 100 parts by weight of an ethylene-propylene copolymer (EP 02P, manufactured by Japan Synthetic Rubber Co., Ltd.) having a melt index of 3.2 g/10 min as measured at 230° C. under a load of 2.2 kg were added, at ambient temperature, 6 parts by weight of a glycidyl ether group-containing modifier shown by formula (VI) given above and 0.16 part by weight of α,α'-bis(t-butylperoxy-m-isopropyl)benzene (Perbutyl P, manufactured by Nippon Oil & Fats Co., Ltd.). This mixture was extruded at 250° C. with a twin-screw extruder (TEX 44, manufactured by The Japan Steel Works, Ltd.), thereby allowing the modifier to react with the copolymer. Thus, a chemically modified polyolefin copolymer (B-4) in pellet form was obtained.

The grafted amount of the modifier was determined by crushing pellets of the chemically modified copolymer, washing the resulting powder five times with methylene chloride to remove the unreacted modifier and homopolymers of the modifier, and then subjecting the washed powder to IR spectroscopy and elemental analysis for nitrogen atom. As a result, the grafted modifier amount was found to be 4.8% by weight.

Chemically modified polyolefin copolymer B-4 obtained above in pellet form had a melt index as measured at 230° C. of 3.8 g/10 min, and was also found to have one structural unit containing a glycidyl ether group and shown by formula (II), per 370 carbon atoms of the polyolefin moiety.

COMPARATIVE EXAMPLES 1 TO 9

The polyarylate and poly(alkylene terephthalate)s used in Examples 1 to 14 and the glycidyl ester group-containing copolymer as specified below were blended according to the formulations given in Table 1. Each blend was extruded at 270° C. with a twin-screw extruder (LABOTEX 30, manufactured by The Japan Steel Works, Ltd.) to produce a resin composition in pellet form.

Glycidyl Ester Group-Containing Copolymer (B-5):

Ethylene/glycidyl methacrylate copolymer (Bondfast E, manufactured by Sumitomo Chemical Co., Ltd., Japan) was used.

2. Measurements of Izod Impact Strength and Spiral Flow Length

Each of the pelleted resin compositions prepared in section 1 above was dried under a reduced pressure at 120° C. for 15 hours and then injection-molded into test pieces. Each of the test piece samples of Examples 1 to 14 and Comparative Examples 1 to 9 was evaluated for Izod impact strength and spiral flow length according to the following methods.

Izod Impact Strength:

Measurement was made in accordance with ASTM D-256 (with ¼-inch notch; ambient temperatures, 23° C. and −30° C.). Spiral Flow:

Using a 3.5-ounce injection-molding machine (IS 80EPN, manufactured by Toshiba Machine Co., Ltd., Japan), each sample was injected into a spiral mold having a gate section of 3 mm×3 mm, width of 4 mm, and thickness of 3 mm under conditions of a cylinder temperature cf 280° C., injection pressure of 120 kg/cm² (gauge pressure), and mold temperature of 80° C. The length of the injected sample that flowed along the mold spiral was measured.

As apparent from Table 1, injectionmolded samples obtained from the resin compositions of the present invention in which chemically modified polyolefin copolymers B-1 to B-4 had been incorporated not only had high Izod impact strengths but showed long spiral flow lengths, i.e., excellent flowability for molding (Examples 1 to 14).

In contrast, molded samples obtained from the compositions consisting only of a polyarylate and either poly(ethylene terephthalate) or poly(butylene terephthalate) had low Izod impact strengths (Comparative Examples 1 to 3 and 7). Further, the compositions containing a chemically modified polyolefin copolymer in amounts outside the range specified hereinabove and the compositions containing glycidyl ester group-containing copolymer B-5 in place of a chemically modified polyolefin copolymer failed to give molded samples which simultaneously had both high impact resistance and good flowability for molding (Comparative Examples 4 to 6, 8, and 9).

It is a surprising fact that, as demonstrated above, the compositions of the present invention produced by incorporating the specific modified polyolefin copolymer into blends of a polyarylate and a poly(alkylene terephthalate) exhibited excellent properties.

As described above in detail, when the resin composition of the present invention is used as a plastic molding material by any of various molding techniques such as injection molding, extrusion, blow molding, and compression molding, plastic molded articles having excellent impact resistance ca be obtained with good flowability for molding which are suited for use as various parts including automotive, machine, and electrical or electronic parts.

While the invention has been described in detail and with reference to specific embodiments thereof, it will be apparent to one skilled in the art that various changes

TABLE 1

| | Composition | | | | | Izod impact strength (kgcm/cm) | | Spiral flow (mm) |
|---|---|---|---|---|---|---|---|---|
| | Polyarylate Parts by weight | PET Parts by weight | PBT Parts by weight | Modified polyolefin copolymer | | | | |
| | | | | kind | Parts by weight | 23° C. | −30° C. | |
| Example | | | | | | | | |
| 1 | 50 | 50 | — | B-1 | 10 | 45 | 11 | 552 |
| 2 | 50 | 50 | — | B-2 | 10 | 51 | 12 | 538 |
| 3 | 50 | 50 | — | B-3 | 10 | 40 | 12 | 569 |
| 4 | 50 | 50 | — | B-4 | 10 | 45 | 14 | 554 |
| 5 | 70 | 30 | — | B-1 | 10 | 59 | 14 | 518 |
| 6 | 30 | 70 | — | B-1 | 10 | 38 | 10 | 620 |
| 7 | 50 | 50 | — | B-1 | 5 | 38 | 9 | 581 |
| 8 | 50 | 50 | — | B-1 | 20 | 60 | 15 | 543 |
| 9 | 50 | — | 50 | B-1 | 10 | 50 | 12 | 554 |
| 10 | 50 | — | 50 | B-3 | 10 | 44 | 13 | 541 |
| 11 | 70 | — | 30 | B-1 | 10 | 65 | 15 | 523 |
| 12 | 30 | — | 70 | B-1 | 10 | 42 | 11 | 627 |
| 13 | 50 | — | 50 | B-1 | 5 | 42 | 9 | 588 |
| 14 | 50 | — | 50 | B-1 | 20 | 66 | 17 | 545 |
| Comparative Example | | | | | | | | |
| 1 | 50 | 50 | — | — | — | 5 | 2 | 570 |
| 2 | 70 | 30 | — | — | — | 9 | 4 | 536 |
| 3 | 30 | 70 | — | — | — | 3 | 1 | 638 |
| 4 | 50 | 50 | — | B-1 | 0.5 | 12 | 3 | 568 |
| 5 | 50 | 50 | — | B-1 | 60 | 67 | 16 | 342 |
| 6 | 50 | 50 | — | B-5 | 10 | 38 | 4 | 137 |
| 7 | 50 | — | 50 | — | — | 8 | 3 | 579 |
| 8 | 50 | — | 50 | B-1 | 60 | 72 | 17 | 366 |
| 9 | 50 | — | 50 | B-5 | 10 | 45 | 8 | 142 |

What is claimed is:

1. A thermoplastic resin composition comprising 100 parts by weight of the following component (A) and from 1 to 50 parts by weight of the following component (B):

(A) a resin component comprising (i) from 10 to 90% by weight of a polyarylate produced by polymerizing (a) a dihydric phenol represented by formula (I)

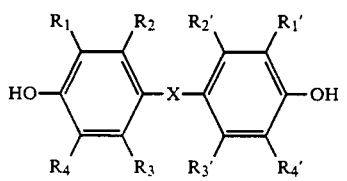

wherein X is one member selected from the group consisting of O, S, SO$_2$, CO, a C$_1$–C$_{20}$ alkylene group, and a C$_6$–C$_{20}$ alkylidene group and R$_1$, R$_2$, R$_3$, R$_4$, R$_1'$, R$_2'$, R$_3'$, and R$_4'$ each is one member selected from the group consisting of hydrogen atom, a halogen atom, and a C$_1$–C$_4$ hydrocarbon group, or a diacetate derivative of the dihydric phenol or alkali metal salt derivative of the dihydric phenol, with (b) an aromatic dicarboxylic acid or a derivative thereof selected from the group consisting of dichloride derivatives, an alkylated derivatives and arylated derivatives; and (ii) from 90 to 10% by weight of a poly(alkylenephenylene ester);

(B) a chemically modified polyolefin copolymer having a structural unit containing at least one amide group and at least one glycidyloxy or glycidyl group, the number of said structural unit contained in the copolymer being one per from 4 to 5,000 carbon atoms of the polyolefin moiety.

2. A thermoplastic resin composition as claimed in claim 1, wherein said chemically modified polyolefin copolymer is one having a glycidyl ether group-containing structural unit represented by formula (II)

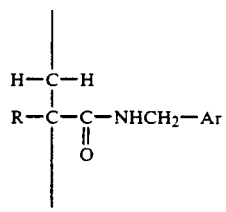

wherein Ar represents an aromatic hydrocarbon group having from 6 to 23 carbon atoms and containing at least one glycidyloxy group and R represents hydrogen atom or methyl group.

3. A thermoplastic resin composition as claimed in claim 2, wherein said glycidyl ether group-containing structural unit represented by formula (II) has been grafted onto a polyolefin.

4. A thermoplastic resin composition as claimed in claim 2, wherein said glycidyl ether group-containing structural unit represented by formula (II) has been polymerized with a polyolefin by means of a random copolymerization.

5. A thermoplastic resin composition as claimed in claim 2, wherein said glycidyl ether group-containing structural unit is shown by formula (III)

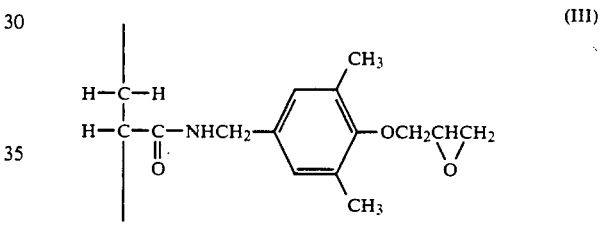

6. A thermoplastic resin composition as claimed in claim 1, wherein said chemically modified polyolefin is prepared from a polyolefin comprising either a copolymer of ethylene and at least one monoolefin having from 3 to 16 carbon atoms or a terpolymer of ethylene, at least one monoolefin having from 3 to 16 carbon atoms, and at least one polyene.

7. A thermoplastic resin composition as claimed in claim 6, wherein said polyolefin is an ethylene-propylene copolymer.

8. A thermoplastic resin composition as claimed in claim 6, wherein said polyolefin is an ethylene-propylenediene terpolymer.

9. A thermoplastic resin composition as claimed in claim 1, wherein said poly(alkylene-phenylene ester) is poly(ethylene terephthalate).

10. A thermoplastic resin composition as claimed in claim 1, wherein said poly(alkylene-phenylene ester) is poly(butylene terephthalate).

* * * * *